INVENTOR.
David Paul Gregg
By Smyth, Roston & Pavitt
Attorneys

INVENTOR:
David Paul Gregg
By Smyth, Roston & Pavitt
Attorneys

INVENTOR:
David Paul Gregg
By Smyth, Roston & Pavitt
Attorneys

United States Patent Office 3,350,503
Patented Oct. 31, 1967

3,350,503

ELECTRON BEAM RECORDING AND REPRODUCING SYSTEM

David Paul Gregg, Los Angeles, Calif., assignor to Minnesota Mining and Manufacturing Company, St. Paul, Minn., a corporation of Delaware Filed Mar. 21, 1962, Ser. No. 181,393
9 Claims. (Cl. 178—6.6)

This invention relates to a system for recording information such as video and audio information on a storage medium such as a tape or disc or cylinder and for reproducing such information from the storage medium. More particularly, the invention relates to a system for recording information on the storage medium and for reproducing the information from the storage medium with considerable fidelity. The invention is especially adapted to be used with a storage medium such as a tape whereby the mechanical and electrical characteristics of the tape are varied in accordance with the characteristics of the signal to be recorded and whereby the variable mechanical and electrical characteristics of the tape control the characteristics of the signal which is reproduced from the tape.

Systems have been devised in recent years for recording information on a storage medium such as a tape or cylinder or disc and for obtaining a subsequent reproduction of the information from the tape or cylinder or disc. For example, the information recorded on the storage medium may constitute video and audio signals having characteristics which represent at each instant an image being viewed and the sounds emanating from the environment of the image. Signals are also recorded on storage media such as tapes or cylinders or discs in representation of different scientific and mathematical information including the readings of instruments and the values obtained from computations performed by digital computers.

The systems now in use generally employ magnetic tapes as the storage medium. These tapes have in general proved quite satisfactory in recording signals representative of information and in obtaining the reproduction of the information with fidelity. The magnetic tapes have to be manufactured with considerable precision such that considerable know-how is required in the manufacture of the tapes. The information recorded on the tapes also has a limited density of packing so that a relatively great amount of tape is required to store a particular amount of information such as that represented by a television program having a duration of approximately one-half hour. The systems now in use also generally require that a transducing head be disposed in contiguous relationship to the tape to record information in magnetic form on the tape and to reproduce such magnetic information as electrical signals from the tape. This contiguous relationship between the transducing head and the tape has caused the tape to rub against the head at times so that magnetic particles become removed from the tape and deposited on the head to affect the operation of the head.

This invention provides a storage medium such as a tape or disc or cylinder having properties such that a transducer does not have to be disposed in contiguous relationship to the storage medium. In one embodiment, a storage medium such as a tape is provided with a backing made from a suitable material such as a polyester designated by the trademark "Mylar." A first coating having properties of emitting secondary elections when subjected to a stream of electrons is disposed on the backing. A second coating having properties of inhibiting the secondary emission of electrons is disposed on the first coating. The second coating is removed by an electron beam at successive positions corresponding to the pattern of the information being recorded so as to expose the first coating. By exposing the first coating, electrons can be subsequently emitted on a secondary basis from the first coating by an electron beam so as to obtain a reproduction of the information.

This invention also provides a system which uses a storage medium such as a tape or disc or cylinder and which is responsive to incoming information so as to vary the mechanical and electrical characteristics of the tape in accordance with such information by removing the second or inhibiting coating on the tape. The second coating on the tape is removed by an electron beam whose characteristics are controlled by signals representative of the incoming information. The variations in the characteristics of the electron beam may be obtained by varying the potential on the grid of an electron gun in accordance with the characteristics of the information to be recorded. Since the electron beam is projected toward the tape from a position removed from the tape, no frictional forces are produced on the tape by the transducing action.

The signals are reproduced from the tape by directing at the tape an electron beam similar to that used during the recording operation. The electron beam directed at the tape during the reproducing operation causes a secondary emission of electrons to be obtained from the tape at the positions where the second or inhibiting coating has been removed from the tape. The electrons secondarily emitted from the tape are amplified by an electron multiplier and are detected after being amplified so as to obtain a recovery of the information previously recorded on the tape.

In addition to the inventive features discussed above, the system constituting this invention also includes means for recovering information recorded on the tape even though the tape may have dust and dirt particles which would otherwise interfere with such recovery of information. The system is able to reproduce the information from the tape regardless of dust particles on the tape because the information is recorded on the tape over an extended area in a direction transverse to the direction of movement of the tape. When a dust particle occurs on the tape, the system automatically operates to shift in a transverse direction the position being examined on the tape. This shift in the transverse direction causes the dust particle to be avoided.

Another important feature of the system constituting this invention results from the inclusion of electrical circuitry for insuring that the information is reproduced from the tape at substantially the same rate as the information is recorded on the tape. This eliminates problems which have resulted from variations in the speed of movement of the tape during the reproduction of information from the tape relative to the speed of movement of the tape during the recording of information on the tape. Such relative variations in the speed of movement of the tape have been designated as "flutter" and "wow." These relative variations in the speed of movement of the tape have occurred for a number of reasons including variations in the operation of the motor driving the tape.

The system constituting this invention minimizes the effects of flutter and wow by providing a coarse control over the speed of movement of the tape at each instant in accordance with the introduction of control signals to the motor driving the tape. Although the coarse control may be considered as conventional, the system constituting this invention provides a fine control which constitutes an important feature of the invention. The fine control is obtained by varying the direction at which the electron beam travels toward the tape so as to vary the position at which the electron beam reaches the tape in the direction of movement of the tape. By controlling the position at which the electron beam reaches the tape at each instant, the signals are reproduced from the tape at a uniform rate corresponding to the rate at which the signals are introduced to the system during the recording operation. As will be appreciated, electronic variations in the rate of reproduction of information from the tape have advantages over controls exerted on such driving members and electrical motors.

Figure 3:
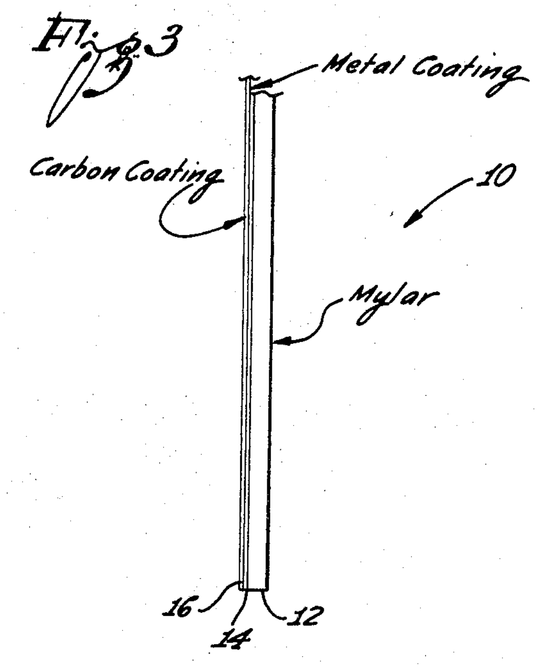
FIGURE 3 is an enlarged sectional view of the storage medium such as the tape illustrated in FIGURES 1 and 2.

The system constituting this invention is adapted to be used with a storage medium such as a tape generally indicated at 18 (FIGURE 3) although other types of media such as discs or cylinders may also be used. The tape is provided with a backing 12 which may be made from a suitable material such as a polyester designated by E. I. du Pont de Nemours under the trademark "Mylar." The backing 12 may be provided with a suitable thickness such as in the order of one mil.

A suitable material such as an alloy of beryllium and copper is disposed on the backing 12 to form a responsive layer 14. The alloy of beryllium and copper may be formed in a suitable thickness such as a thickness of one micron as by vacuum deposition to form the responsive layer 14, although layers of increased thickness may also be used. The responsive layer 14 is formed from a suitable material so that it will emit secondary electrons when bombarded by a stream of charged particles such as electrons. It will be appreciated that other materials such as an alloy of silver and cesium or an alloy of antimony and cesium may also be used. Such materials are disclosed in "Reference Data for Radio Engineers" (fourth edition) published by The International Telephone & Telegraph Company of 67 Broad St., New York, N.Y.

A layer 16 of inhibiting material is deposited as by vacuum techniques on the responsive layer 14. The inhibiting layer 16 is provided with characteristics to prevent the secondary emission of electrons by the responsive layer 14 at the positions where the inhibiting layer 16 covers the responsive layer 14. The inhibiting layer 16 also has characteristics for providing a negligible emission of electrons from its surface when the surface is subjected to a stream of charged particles such as electrons. By way of illustration, the inhibiting layer 16 may be made from a suitable material such as carbon and may be provided with a suitable thickness such as a thickness in the order of 1 micron, although increased thicknesses are also effective.

Figure 1:
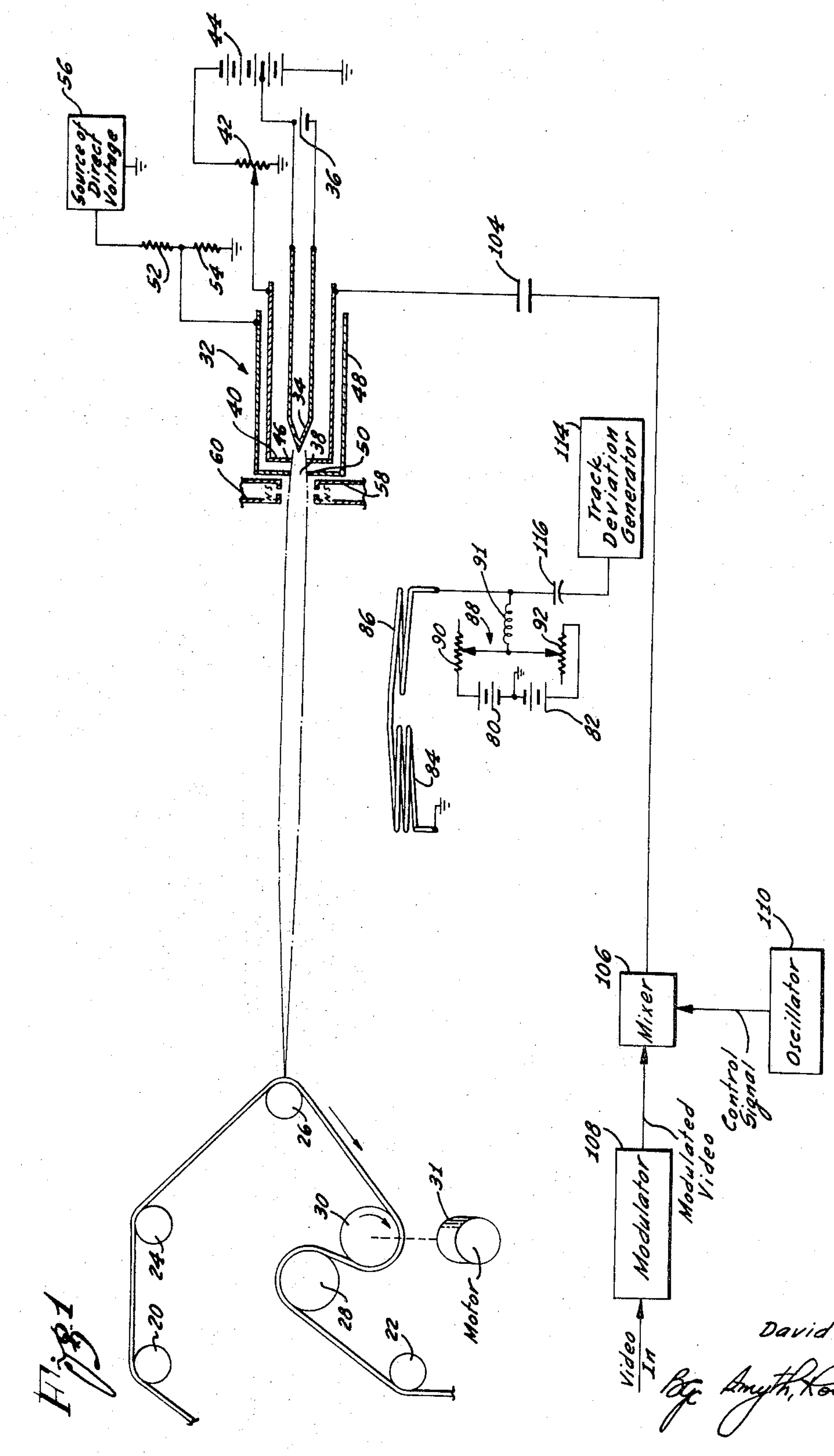
FIGURE 1 is a circuit diagram, partly in block form, of a system for obtaining a recording of information on a tape and also includes a schematic representation of apparatus for driving the tape past the recording position.

The tape 10 is driven from a payout reel 20 to a take-up reel 22 (FIGURE 1). The tape is tensioned and guided during its movement between the reels 20 and 22 by guide rollers 24, 26 and 28. A capstan 30 in association with nip rollers (not shown) may be used to provide a positive drive of the tape from the reel 20 to the reel 22. The capstan 30 is coupled mechanically to a motor 31 so as to be driven by the motor. It will be appreciated that the drive and guide assembly, including the reels 20 and 22, the guide rollers 24, 26 and 28 and the capstan 30 are included by way of illustration and that the other forms of drive assemblies may be used.

The tape is subjected to a beam of charged particles as it moves past the drive roller 26. This beam of charged particles is obtained from an electron gun generally indicated at 32. The electron gun 32 includes a filament 34 which is constructed from a suitable material to emit charged particles such as electrons when current flows through the filament. The current may be provided by a suitable source of direct voltage such as a battery 36. The filament 34 is shaped to direct the electrons in a beam, such as illustrated at 38, toward the tape 10 as the tape moves past the roller 26. For example, the filament is provided with a pair of walls which converge in a direction toward the roller 26.

The electron gun 32 also includes a grid 40 which is disposed between the filament 34 and the roller 26 at a position adjacent to the filament. The grid 40 is adjustably biased by connecting the grid to the movable arm of a potentiometer 42 and by connecting the potentiometer 42 in series with a suitable source of voltage such as a battery 44. One terminal of the potentiometer 42 and the positive terminal of the battery 44 may be connected to a suitable reference potential such as ground. The grid 40 is provided with an aperture 46 at a position adjacent to the converging end of the filament 34 to provide for a shaping of the beam 38 of charged particles.

The electron gun also includes an anode 48 which is provided with an aperture 50 to further shape the beam 38 of electrons. The anode 48 is connected to a voltage-dividing network, including a pair of resistors 52 and 54, to receive a positive voltage of relatively great magnitude from a source 56 of direct voltage. For example, the voltage applied to the anode 48 may be in the order of +1000 volts.

In addition to the focusing action on the beam of electrons by the aperture 46 in the grid 40 and the aperture 50 in the anode 48, further focusing actions may be produced as by magnetic lenses 58 and 60. Each of the lenses 58 and 60 may constitute a permanent magnet which is shaped as a hollow annular ring. The axis of the magnets 58 and 60 corresponds to the center of each of the apertures 46 and 50.

The electron beam 38 is also subjected to a controlled deflection by a pair of coils 84 and 86 in a transverse direction relative to the tape. The coils 84 and 86 are connected to a voltage source which is generally indicated at 88 and which includes a pair of potentiometers 90 and 92, a choke coil 91 and a pair of batteries 80 and 82. The coils 84 and 86 are connected in series between a suitable reference potential such as ground and one terminal of the coil 91. The other terminal of the choke coil 91 is connected to the movable arms of the potentiometers 90 and 92. The potentiometers 90 and 92 are respectively connected to the positive terminals of the batteries 80 and 82, the negative terminals of which are grounded.

Although the deflection of the electron beam 38 is illustrated as being produced by the magnetic coils 84 and 86, it will be appreciated that the deflection may be produced by other means without departing from the scope of the invention. For example, the deflection may be produced by capacitive plates which provide an electrostatic action.

The grid 40 of the electron gun 32 also receives video signals through a coupling capacitor 104 from a mixer 106. The video signals are frequency-modulated in a conventional manner such that the video information is represented at each instant by the variations in the frequency of the FM signal from a central frequency. The frequency modulation of the signals occurs in a modulator 108, the output of which is connected to the mixer 106 to introduce the frequency modulated signals to the mixer. A control signal at a particular frequency such as 8 megacycles is also introduced to the mixer 106 from an oscillator 110 so as to control the repetitive pattern of the signals recorded on the tape. It will be appreciated that the signals from the mixer 106 may be amplified before being introduced to the focusing member 100.

The frequency modulated signals from the mixer 106 control the number of electrons passing through the electron gun 32 at each instant. When the frequency modulated signals have a positive polarity, the voltage introduced to the grid 40 of the electron gun from the mixer 106 biases the grid positive relative to the cathode 34. This causes the electrons emitted by the cathode 34 to become accelerated so as to pass through the electron gun and impinge on the tape 10. When the frequency modulated signals from the mixer 10 have a negative polarity, however, the grid 42 is biased relative to the cathode 34 so that the electron beam cannot travel through the electron gun 32.

The action of the electron beam on the tape at each instant is dependent upon the number of the electrons in the beam 38. When the beam has a relatively great number of electrons, the beam impinges on the tape 10 with a sufficient force to remove the inhibiting layer 16 from the tape. This causes the responsive layer 14 to be exposed. However, when the concentration of the electrons in the beam 38 becomes reduced as by a signal of negative polarity on the grid 40, the beam does not strike the tape with a sufficient concentration to remove the inhibiting layer 16. In this way, the frequency modulations representing the video information are repeated on the tape by the pattern of the inhibiting layer 16 on the responsive layer 14 at the successive positions in the direction of movement of the tape.

The signals can be recorded on the tape by the system constituting this invention at a density higher than that attained by previous systems. For example, the signals can be recorded with a density of approximately 25,000 cycles per inch or 375,000 cycles per second at a tape speed of approximately 15 inches per second on a very narrow track. The signals are not recorded in the transverse direction but are recorded only in the direction of movement of the tape from the reel 20 to the reel 22. It will be appreciated, however, that the system can be modified without departing from the scope of the invention so as to record in a transverse direction across the tape during the movement of the tape from the reel 20 to the reel 22. It will also be appreciated that the signals can be recorded on a disc or cylinder as well as on the tape.

When signals are recorded only in the direction of movement of the tape, means are included for increasing the width of the signals in the transverse direction of the tape. Such means include a generator 114 which is constructed to provide signals at a suitable frequency such as approximately 80 megacycles per second. These signals are introduced through a capacitor 116 to the coils 84 and 86 so as to produce a sinusoidal deflection of the electron beam 38 in a horizontal direction at a frequency corresponding to the frequency of the signals from the generator 114. Since the beam becomes horizontally deflected at a relatively high frequency such as 80 megacycles per second, the beam effectively becomes broadened in the transverse direction, as illustrated at 118 in FIGURE 4. As will be evident from FIGURE 4, the dark positions 120 on the tape correspond to the positions at which the inhibiting layer 16 is removed from the tape and the light positions 122 between the dark positions 120 correspond to the positions at which the inhibiting layer 16 continues to remain on the tape.

Figure 2:
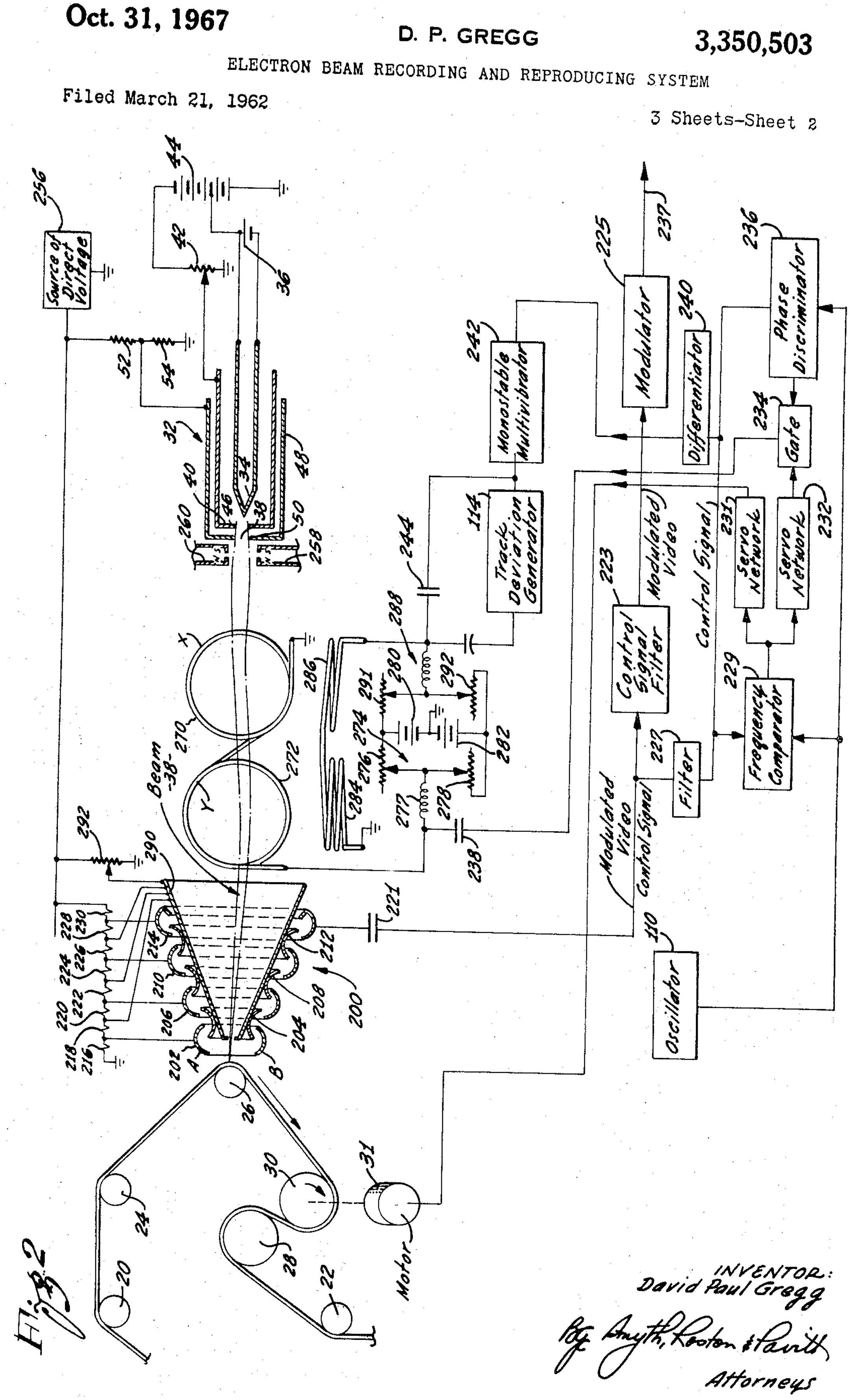
FIGURE 2 is a circuit diagram, partly in block form, of a system for obtaining a reproduction of the information previously recorded on the storage medium such as the tape by the recording system illustrated in FIGURE 1 and also includes a schematic representation of the apparatus for driving the tape.

FIGURE 2 illustrates a system for reproducing information previously recorded on the tape 10. When the information recorded on the tape 10 is to be reproduced from the tape, the electron beam 38 is directed toward the tape in a manner similar to that described above. As the electron beam moves from the electron gun 32 toward the tape 10, it is subjected to a focusing action as by magnetic lenses 258 and 260 in FIGURE 2. Each of the lenses 258 and 260 may constitute a permanent magnet which is shaped as a hollow annular ring. The axis of the magnets 258 and 260 corresponds to the center of each of the apertures 46 and 50.

The longitudinal direction of the electron beam relative to the tape is controlled by a pair of coils 270 and 272. The coils 270 and 272 are connected in series between a suitable reference potential such as ground and a source of potential such as that indicated generally at 274. The source of potential 274 includes a pair of potentiometers 276 and 278 having their movable arms coupled electrically to the coil 272 either directly or through a choke coil 277. The potentiometers 276 and 278 are respectively connected to the positive terminals of suitable sources of direct voltage such as batteries 280 and 282. The negative terminals of the batteries 280 and 282 are connected to a suitable reference potential such as ground.

As the electrons in the beam 38 pass the coils 270 and 272, they become subjected to a force in the longitudinal direction because of the combination of the magnetic field produced by the current flowing through the coils and the electrostatic field produced between the different electrons in the beam. This causes the electron beam to be deflected downwardly, as indicated schematically in FIGURE 1, as the electron beam moves past the coil 270. The coil 272 acts to deflect the electron beam upwardly in a similar manner. The deflections of the electron beam 38 by the coils 270 and 272 can be controlled by adjusting the movable arms of the potentiometers 276 and 278 so as to produce a movement of the beam to a position on the tape 10 corresponding to the axis defined by the magnetic rings 258 and 260.

The electron beam 38 is also subjected to a controlled deflection in the transverse direction by a pair of coils 284 and 286 respectively corresponding to the coils 84 and 86 in FIGURE 1. The coils 284 and 286 are connected to a voltage source which is generally indicated at 288 and which includes a pair of potentiometers 291 and 292 and the batteries 280 and 282. The coils 284 and 286, the potentiometers 291 and 292 and the batteries 280 and 282 are connected in an arrangement similar to that provided by the coils 270 and 272, the potentiometers 276 and 278 and the batteries 280 and 282. The coils 284 and 286 are disposed with their axes in a direction substantially perpendicular to the axes of the coils 270 and 272 so as to produce on the electrons in the beam 38 a force substantially perpendicular to that produced by the coils 270 and 272.

After being subjected to the horizontal and vertical deflecting fields, the electron beam 38 travels through an electron multiplier generally indicated at 200, which includes a member 290 having a suitable configuration such as a frusto-conical shape. The member 290 is disposed so that the base of its frusto-conical configuration is disposed near the coil 270 and the apex of its frusto-conical configuration is disposed near the tape 10. The axis of the member 290 corresponds to the axis defined by the centers of the magnetic rings 258 and 260.

The member 290 is made from an electrically conductive material and is connected to the movable arm of a potentiometer 292 to receive a positive potential from a source 256. One end terminal of the potentiometer 292 is connected to the source 256 of direct voltage and the other end terminal is connected to a suitable reference potential such as ground.The focusing action provided by the member 290 on the electron beam 38 is dependent upon the voltage applied at each instant to the focusing member. By way of illustration, a potential in the order of 1000 volts may be applied to the electron multiplier 200.

The focusing members 258 and 260, the deflecting members 270 and 272 and the deflecting members 284 and 286 are instrumental in obtaining a movement of the electron beam to the tape 10 in a proper disposition relative to the tape to obtain an emission of secondary electrons from the tape. This emission of electrons from the responsive layer 14 on the tape 10 occurs at the positions where the inhibiting layer 16 has been removed. The electrons secondary emitted from the responsive layer 14 are introduced to the electron multiplier 200 in FIGURE 2. The electron multiplier operates to produce an increased number of electrons relative to the number secondarily emitted from the tape so as to effectively provide an amplification of the signals reproduced from the tape 10.

Figure 4:
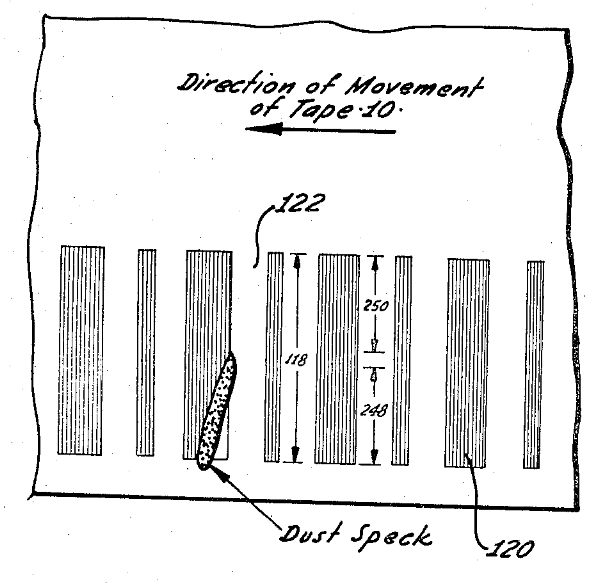
FIGURE 4 is an enlarged fragmentary sectional view schematically illustrating the characteristics of the signals recorded on the tape.

The electron multiplier 200 includes a plurality of toroids each disposed at a progressive position along the external surface of the member 290. The toroids are indicated at 202, 204, 206, 208, 210, 212 and 214. Although seven toroids are illustrated in FIGURE 4, it will be appreciated that any suitable number of toroids may be used. Each of the toroids 202, 204, 206, 208, 210, 212 and 214 is formed from a conductive material and is shaped so that the end removed from the tape 10 has a greater diameter than the end near the tape. Each of the toroids is provided with a curved configuration in the axial direction and is disposed in partly overlapping relationship to the adjacent toroids. The toroids 202, 206, 210 and 214 are provided with a convex configuration and the toroids 204, 208 and 212 are provided with a concave configuration. The toroids 204, 208 and 212 are disposed internally relative to the toroids 202, 206, 210 and 214 so as to face the toroids 202, 206, 210 and 214.

The toroids 202, 204, 206, 208, 210, 212 and 214 are connected to progressive terminals in a voltage-dividing network so as to receive voltages of progressively increase magnitude. The voltage-dividing network may be formed from a plurality of series resistances 216, 218, 220, 222, 224, 226, 228 and 230 and may be connected between a suitable reference potential such as ground and the source 256 of direct voltage. Because of the relative disposition of the toroids 202, 204, 206, 208, 210, 212 and 214 and because of the relative voltages applied to these toroids, each of the toroids operates to receive a particular number of electrons and to produce an increased number of electrons for passage to the next toroid. For example, the toroids 202 receives the electrons secondarily emitted from the responsive layer 14 of the tape 10 at each instant and produces an increased number of electrons relative to the number received by the toroid. Since the toroid 204 is disposed internally and in overlapping relationship with respect to the toroid 202, the electrons emitted from the toroid 202 travel to the toroid 204 and cause an increased number of electrons to be produced by the toroid 204. The toroid 206 in turn receives the electrons emitted by the toroid 204 and produces an increased number of electrons.

The electrons received by the toroid 214 cause a signal to pass through a coupling capacitor 221 to a filter 223. The amplitude of the signal passing at each instant to the filter 223 corresponds to the number of electrons emitted by the toroid 214 at that instant. The filter 223 is provided with characteristics to remove the control signal which is recorded on the tape 10 as a result of the introduction of signals from the oscillator 110 to the mixer 106, in FIGURE 1. In this way, only the frequency-modulated signals corresponding to the signals produced by the modulator 108 in FIGURE 1 are introduced to a modulator 225. The modulator 225 is operative to detect the frequency modulations of the signals reproduced from the tape and to convert these frequency modulations into signals with corresponding amplitude modulations. The signals with amplitude modulations pass through an output line 237 to conventional stages which are operative to provide an indication of the information represented by these signals. Such an indication may be visual if video information has been recorded on the tape. For example, the visual indication of the information represented by the video signals may be provided on the face of a television tube (not shown).

The signals passing through the capacitor 221 from the toroid 214 are also introduced to a filter 227. The filter 227 is provided with characteristics to pass only the control signal recorded on the tape 10 at a frequency of 8 megacycles as a result of the introduction of signals from the oscillator 110. These control signals are compared in a comparator 229 with the reference signals of 8 megacycles from the oscillator 110. The comparator 229 is provided with characteristics to produce signals having a first polarity upon the occurrence of a signal of higher frequency from the oscillator 110 than from the filter 227 and having an opposite polarity upon the occurrence of a signal of higher frequency from the filter 227 than from the oscillator 110. The signals produced by the comparator 229 having an amplitude dependent upon the magnitude of any difference between the frequencies of the signals from the osscillator 110 and the filter 227.

The frequency comparator 229 may be constructed to produce signals only when the frequencies of the signals from the oscillator 110 and the filter 227 are different by at least a particular amount such as at least one cycle per second. Under such circumstances, a signal passes through a servo network 231 to the motor 31, which drives the capstan 30. The servo network 231 may be constructed in a conventional manner to vary the energizing potential introduced to the motor 31 in accordance with the variations in the phase and amplitude of the signal from the comparator 229. In this way, the speed of the motor 31 is regulated at successive instants of time so that the frequency of the control signals recovered from the tape 10 corresponds substantially to the frequency of the control signals from the oscillator 110. This causes the signals to be reproduced from the tape 10 at substantially the same rate at which they are recorded on the tape, thereby providing a faithful reproduction of the information represented by the signals.

The signals from the frequency comparator 229 are also introduced to a servo network 232. This servo network is connected to a gate 234 to introduce a signal to the gate for opening the gate when the signals from the filter 224 have a frequency different by a particular amount, such as one cycle or less, from the frequency of the signals provided by the oscillator 110. The gate 234 may be constructed in a conventional manner so as to become biased to a state of non-conductivity upon the introduction of a proper voltage from the servo network 232 and to become opened upon the introduction of a particular signal from the servo network 232.

When the gate 234 becomes opened, it passes a signal from a phase discriminator 236. The phase discriminator 236 may be constructed in a conventional manner to produce a voltage having a polarity dependent upon the relative phases of the signals from the filter 227 and the oscillator 110. The voltage produced by the phase discriminator 236 has an amplitude dependent upon the magnitude of any difference in the phases of the signals from the filter 227 and the oscillator 110.

The signals from the discriminator 236 pass through the gate 234 when the gate becomes opened by a proper voltage from the servo network 232. The signals passing through the gate 234 are introduced through a coupling capacitor 238 to the vertical deflection coils 272 and 270. These signals vary the deflecting action of the coils 270 and 272 in accordance with the phase and amplitude characteristics of the signal. By varying the vertical deflections produced on the electron beam 38 by the coils 270 and 272, the signals passing through the gate 234 regulate the position at which the electron beam 38 reaches the tape 10 in the direction of movement of the tape. The signals provide such a regulating action since the effective length of the path traversed by the electron beam 38 from the center of the coil 272 to the tape 10 is different from the effective length of the path traversed by the electron beam between the coils 270 and 272.

It will be seen from the above discussion that the motor 31 is regulated in speed to provide a coarse control of the frequency at which the signals are reproduced from the tape 10. A fine control is provided over the rate of reproduction of signals from the tape 10 by regulating the disposition of the electron beam 38 relative to the tape at each instant of time. Regulating the disposition of the electron beam 38 relative to the tape 10 in the direction of movement of the tape is desirable as a fine control since problems resulting from the mechanical inertia of driving members such as motors are eliminated. In this way, a sensitive control is provided over the rate of reproduction of signals from the tape 10 by electronically controlling at each instant the position at which the electron beam 38 impinges on the tape 10.

During the time that no dust spots or foreign particles occur on the tape 10 at the position being scanned by the electron beam 38, signals at the control frequency of substantially 8 megacycles per second are reproduced from the tape. These signals pass through the filter 227 but do not pass through a differentiator 240 because of their continuous characteristics. However, when a dust spot or a foreign particle occurs on the tape 10 at the position being scanned by the electron beam 38, the control signals at the frequency of substantially 8 megacycles per second are momentarily interrupted. This causes a transient condition to be produced such that signals with relatively sharp characteristics pass momentarily through the filter 227. These signals are further sharpened by the differentiator 240 such that a triggering signal passes from the differentiator to a monostable multivibrator 242.

The monostable multivibrator 242 is constructed in a conventional manner and is provided with two stages which are interconnected so that a first stage is normally in a state of conductivity and the second stage is normally in a state of nonconductivity. When a triggering signal is introduced to the second stage of the multivibrator 242 from the differentiator 240, the second stage of the multivibrator becomes conductive. Because of the interrelationship between the first and second stages of the multivibrator 242, the first stage of the multivibrator becomes non-conductive when the second stage of the multivibrator becomes conductive.

The signal produced by the first stage of the multivibrator 242 upon becoming triggered from a state of conductivity to a state of non-conductivity is introduced to the coils 286 and 284. This signal may be introduced to the coils 286 and 284 through a capacitor 244. The signal causes the deflection produced by the coils 286 and 284 on the electron beam 38 in the horizontal direction to become varied. Because of this, the horizontal position scanned on the tape 10 by the electron beam 38 becomes shifted. By way of illustration, the electron beam 38 may be normally scanning a horizontal position 248 in FIGURE 4 and may become shifted by a signal from the multivibrator 242 to scan a horizontal position 250 in that figure.

The monostable multivibrator 242 is provided with characteristics to retain its first stage in a state of non-conductivity for only a limited period of time every time that the multivibrator becomes triggered by a signal from the differentiator 240. For example, the multivibrator 242 may remain triggered for only 1/10 second. The multivibrator then returns to its normal state in which its first stage is conductive and its second stage is non-conductive. When this occurs, the electron beam 38 scans the horizontal position 248 on the tape 10 until the next occurrence of a dust spot or a foreign particle on the tape at the position being scanned. The electron beam 38 then becomes shifted from the horizontal position 248 to the horizontal position 250 in a manner similar to that described above.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination in a system for reproducing information from a medium movable in a first direction where the medium has characteristics for responding to energy directed at the medium in accordance with variations in the physical characteristics of the medium at successive positions, motive means for obtaining a movement of the medium in the first direction, means for directing a beam of energy at the medium to obtain a response of the medium to the energy in accordance with variations in the physical characteristics of the medium at the successive positions in the first direction, means for producing output signals in accordance with the response of the medium to the energy directed at the medium, means responsive to relatively great variations from a particular value in the rate of production of signals by the output signal means for varying the operation of the motive means to maintain the rate of production of the signals at substantially the particular value, and means responsive to relatively small variations in the rate of production of signals by the output signal means from the particular value for varying the direction of the energy at the medium to maintain the rate of production of the signals at the particular value.

2. In combination for reproducing signals from a medium movable in a first direction where the medium has characteristics for responding to energy directed at the medium in accordance with variations in the physical characteristics of the medium at successive positions, means for providing a movement of the medium in a first direction, means disposed relative to the medium for directing energy in a beam at the medium to obtain a response by the medium in accordance with variations in the physical characteristics of the medium at successive positions, means disposed relative to the beam of energy for focussing the beam during the passage of the beam toward the medium, means for producing output signals having characteristics representing the response of the medium to the beam directed at the medium, and means responsive to the rate of production of the output signals by the last mentioned means for varying the direction of passage of the beam of energy to the medium in a direction transverse to the direction of the medium without affecting the focussing action by the focussing means on the beam of energy.

3. In combination for reproducing signals from a medium movable in a first direction where the signals have been recorded in a second direction transverse to the first direction through a particular distance during the recording operation and where the medium has characteristics for responding to energy directed at the medium in accordance with variations in the physical characteristics of the medium at successive positions; means disposed relative to the medium for directing a beam of energy toward the medium to obtain a response by the medium in accordance with the variations in the physical characteristics of the medium at the successive positions, means operatively coupled to the medium for producing signals in accordance with the response of the medium to the energy directed at the medium, means operatively coupled to the energy-beaming means for obtaining a focus of the energy at a first particular position on the beam in the second direction, and means operatively coupled to the focus means and responsive to particular changes in the characteristics produced by the signal means for obtaining a shift in the second direction in the focus of the energy beam from the first particular position to a second position displaced from the first particular position in the second particular direction.

4. In combination for reproducing signals recorded on a medium movable in a first direction during the recording operation where the signals have been oscillated at a particular rate in a second direction transverse to the first direction through a particular distance during the recording operation and where the medium is movable in the first direction during the reproducing operation, means for obtaining a movement of the medium in the first direction, means operatively disposed relative to the medium for reproducing signals having characteristics representing the information recorded on the medium, means operatively coupled to the reproducing means for obtaining an oscillation of the reproducing means relative to the medium in the second direction through a first particular portion of the particular distance, and means operatively coupled to the reproducing means and responsive to abrupt changes in the characteristics of the reproduced signals for obtaining an oscillation of the reproducing means relative to the medium through a second particular portion of the particular distance.

5. A recording medium for use with record and reproduce modes, including, a backing member, a first material disposed on the backing member and having properties of secondarily emitting charged particles when subjected to a beam of energy during the reproduce mode, and a second material disposed on the first material and having properties of inhibiting the secondary emission of charged particles when subjected to the beam of energy during the reproduce mode and further having properties of becoming removed to expose the first material when subjected to a beam of energy during the record mode.

6. A recording medium for use with record and reproduce modes, including, a backing member, a first material disposed in a thin layer on the backing member and having properties of secondarily emitting electrons when subjected to a beam of energy during the reproduce mode, and a second material disposed in a thin layer on the backing member and having properties of inhibiting the secondary emission of electrons when subjected to a beam of energy during the reproduce mode, the second material being disposed on the first material in a manner to be removed from the first material by the beam of energy during the record mode in a pattern representing information to be recorded on the medium.

7. A recording medium for use during record and reproduce modes, including, a backing member, a first material disposed in a uniformly thin layer on the backing member and having properties of secondarily emitting electrons when subjected to a beam of energy during the reproduce mode, a second material disposed in a uniformly thin layer on the first material and having properties of inhibiting the secondary emission of electrons when subjected to a beam of energy during the reproduce mode and having properties of becoming removed from the first material when subjected to a concentrated beam of energy during the record mode.

8. In combination for recording information, a backing member, a first material disposed in a thin layer on the backing member and having properties of secondarily emitting electrons when subjected to a beam of energy, a second material disposed in a thin layer on the layer of first material and having properties of inhibiting the secondary emission of electrons and having properties of becoming removed from the layer of first material when subjected to the beam of energy, and means disposed relative to the layer of second material for subjecting the second material to a beam of energy in a pattern representing information to be recorded to obtain the removal of the second material in a corresponding pattern.

9. In combination for reproducing information, a backing member, a first material disposed in a thin layer on the backing member and having properties of secondarily emitting electrons when subjected to a beam of energy, a second material disposed in a thin layer on the layer of the first material and having properties of inhibiting the secondary emission of electrons by the first layer, the second layer being removed from the layer of the first material in a pattern corresponding to information recorded on the layers of the first and second materials, means disposed relative to the layer of the first and second materials for directing a beam of energy toward the first and second layers to obtain an emission of electrons from the layer of the first material at the positions where the layer of the second material has been removed and the layer of first material is exposed, means responsive to the electrons secondarily emitted from the layer of the first material to produce signals having characteristics representing the number of electrons secondarily emitted from the layer of the first material, and means for obtaining a movement of the backing member and the layers of the first and second materials relative to the beam of energy.

References Cited

UNITED STATES PATENTS

| | | | |
|---|---|---|---|
| 3,042,825 | 7/1962 | Bambara et al. | 178—6.6 X |
| 3,168,726 | 2/1965 | Boblett | 340—173 |
| 3,226,696 | 12/1965 | Dove | 340—173 |

OTHER REFERENCES

"Video Tape Recording" (Bernstein), published by Rider (New York), 160 (p. 89 relied on; copy in Division 41).

Electronic Technician, February 1960, p. 32 relied on (copy in Scientific Library TK 6540.R7).

JOHN W. CALDWELL, *Acting Primary Examiner.*

DAVID G. REDINBAUGH, ROY LAKE, *Examiners.*

R. L. RICHARDSON, J. McHUGH, J. LAWSON, *Assistant Examiners.*